(12) United States Patent
Cai

(10) Patent No.: US 10,399,019 B2
(45) Date of Patent: Sep. 3, 2019

(54) INTEGRATED COMPOSITE FILTER AND WATER PURIFICATION SYSTEM HAVING THE SAME

(71) Applicants: GUANGDONG MIDEA WATER DISPENSER MFG. CO., LTD., Foshan (CN); MIDEA GROUP CO., LTD., Foshan (CN)

(72) Inventor: Xuegang Cai, Foshan (CN)

(73) Assignees: GUANGDONG MIDEA WATER DISPENSER MFG. CO., LTD., Foshan (CN); MIDEA GROUP CO., LTD., Foshan (CN)

(*) Notice: Subject to any disclaimer, the term of this patent is extended or adjusted under 35 U.S.C. 154(b) by 387 days.

(21) Appl. No.: 14/847,085

(22) Filed: Sep. 8, 2015

(65) Prior Publication Data

US 2016/0175746 A1   Jun. 23, 2016

(30) Foreign Application Priority Data

Dec. 19, 2014   (CN) .......................... 2014 1 0814047
Dec. 19, 2014   (CN) ...................... 2014 2 0826203 U

(51) Int. Cl.
*B01D 29/11* (2006.01)
*B01D 29/15* (2006.01)
(Continued)

(52) U.S. Cl.
CPC ............ *B01D 35/26* (2013.01); *B01D 29/115* (2013.01); *B01D 29/58* (2013.01);
(Continued)

(58) Field of Classification Search
CPC ........ B01D 61/08; B01D 61/18; B01D 61/28; B01D 69/10; B01D 29/15; B01D 29/58;
(Continued)

(56) References Cited

U.S. PATENT DOCUMENTS 4,983,288 A * 1/1991 Karbachsch ........... B01D 69/12
                                                          210/321.87
4,992,170 A * 2/1991 Menon ................... B01D 61/08
                                                          210/321.78
(Continued)

FOREIGN PATENT DOCUMENTS

CN   101468298   7/2009
CN   101670204   3/2010
(Continued)

OTHER PUBLICATIONS

Machine translation of DE 3805361.*
(Continued)

*Primary Examiner* — Benjamin L Lebron
(74) *Attorney, Agent, or Firm* — Hodgson Russ LLP

(57) ABSTRACT

An integrated composite filter and a water purification system having the same are provided. The integrated composite filter includes: a shell defining a chamber therein, and defining a raw water inlet, a pretreated water outlet, a pretreated water inlet, a pure water outlet and a waste water outlet which are in communication with the chamber respectively; a pretreating filtering element disposed within the chamber; a filtering membrane disposed within the chamber. The pretreating filtering element and the filtering membrane are sequentially positioned between the raw water inlet and the pure water outlet as well as the waste water outlet, and the pretreating filtering element is positioned between the raw water inlet and the pretreated water outlet, and the filtering membrane is positioned between the pretreated water inlet and the pure water outlet as well as the waste water outlet.

16 Claims, 9 Drawing Sheets

(51) Int. Cl.

| | | |
|---|---|---|
| *B01D 29/58* | (2006.01) | |
| *B01D 35/157* | (2006.01) | |
| *B01D 35/30* | (2006.01) | |
| *B01D 39/04* | (2006.01) | |
| *B01D 39/16* | (2006.01) | |
| *B01D 61/02* | (2006.01) | |
| *B01D 61/04* | (2006.01) | |
| *B01D 61/08* | (2006.01) | |
| *B01D 61/10* | (2006.01) | |
| *B01D 61/14* | (2006.01) | |
| *B01D 61/18* | (2006.01) | |
| *B01D 61/28* | (2006.01) | |
| *B01D 63/06* | (2006.01) | |
| *B01D 69/10* | (2006.01) | |
| *C02F 1/00* | (2006.01) | |
| *C02F 1/28* | (2006.01) | |
| *C02F 1/44* | (2006.01) | |
| *C02F 9/00* | (2006.01) | |
| *B01D 35/26* | (2006.01) | |
| *B01D 61/12* | (2006.01) | |

(52) U.S. Cl.
CPC ......... *B01D 35/1573* (2013.01); *B01D 35/30* (2013.01); *B01D 35/303* (2013.01); *B01D 39/04* (2013.01); *B01D 39/1615* (2013.01); *B01D 39/1692* (2013.01); *B01D 61/025* (2013.01); *B01D 61/04* (2013.01); *B01D 61/08* (2013.01); *B01D 61/10* (2013.01); *B01D 61/14* (2013.01); *B01D 61/18* (2013.01); *B01D 61/28* (2013.01); *B01D 69/10* (2013.01); *C02F 1/001* (2013.01); *C02F 1/003* (2013.01); *C02F 1/44* (2013.01); *C02F 1/441* (2013.01); *C02F 1/444* (2013.01); *C02F 9/005* (2013.01); *B01D 61/12* (2013.01); *B01D 63/06* (2013.01); *B01D 63/065* (2013.01); *B01D 2239/065* (2013.01); *B01D 2311/2626* (2013.01); *B01D 2311/2649* (2013.01); *B01D 2313/44* (2013.01); *C02F 1/283* (2013.01); *C02F 1/442* (2013.01); *C02F 2201/003* (2013.01); *C02F 2201/006* (2013.01); *C02F 2201/007* (2013.01)

(58) Field of Classification Search
CPC .. B01D 29/115; B01D 39/04; B01D 39/1692; B01D 39/1615; B01D 35/26; B01D 35/1573; B01D 63/065; B01D 63/06; B01D 63/10; B01D 2311/2626; B01D 2311/2649; B01D 2313/44; B01D 2239/065; B01D 65/00; B01D 35/30; B01D 35/303; B01D 61/025; B01D 61/04; B01D 61/10; B01D 61/12; B01D 61/14; C02F 1/001; C02F 1/44; C02F 1/441; C02F 1/444; C02F 1/442; C02F 1/283; C02F 2201/003; C02F 2201/007; C02F 9/00; C02F 9/005; C02F 1/003; C02F 2201/006

See application file for complete search history.

(56) References Cited

U.S. PATENT DOCUMENTS

| | | | | |
|---|---|---|---|---|
| 5,078,876 | A * | 1/1992 | Whittier | B01D 61/08 210/294 |
| 5,445,729 | A * | 8/1995 | Monroe | B01D 61/08 210/109 |
| 5,601,710 | A * | 2/1997 | Yoon | B01D 29/114 210/232 |
| 5,620,597 | A * | 4/1997 | Andelman | B01D 15/00 204/600 |
| 6,099,735 | A * | 8/2000 | Kelada | B01D 61/08 210/134 |
| 7,267,769 | B2 * | 9/2007 | Baird | B01D 61/025 210/232 |
| 2003/0164333 | A1 | 9/2003 | Nohren, Jr. et al. | |
| 2004/0104161 | A1 * | 6/2004 | Gaignet | B01D 35/303 210/323.2 |
| 2005/0194317 | A1 | 9/2005 | Ikeyama et al. | |
| 2009/0194478 | A1 * | 8/2009 | Saveliev | B01D 61/10 210/636 |
| 2012/0261333 | A1 | 10/2012 | Moran et al. | |
| 2013/0220903 | A1 * | 8/2013 | Tsai | C02F 9/005 210/104 |

FOREIGN PATENT DOCUMENTS

| | | |
|---|---|---|
| CN | 101670204 A | 3/2010 |
| CN | 202193666 | 4/2012 |
| CN | 202705130 | 1/2013 |
| CN | 103071334 | 5/2013 |
| CN | 203451305 | 2/2014 |
| CN | 203904091 | 10/2014 |
| CN | 203904091 U | 10/2014 |
| CN | 203938534 U | 11/2014 |
| CN | 104528976 A | 4/2015 |
| CN | 204310893 | 5/2015 |
| DE | 3805361 A1 | 9/1988 |

OTHER PUBLICATIONS

The State Intellectual Property Office of People's Republic of China, The Third Office Action for CN201410814047.1, dated Jul. 29, 2016.
ISA/CN, International Search Report and Written Opinion for PCT/CN2015/078075, dated Sep. 15, 2015.
European Patent Office, Extended European Search Report for EP15002665.6, dated May 9, 2016.
IPO, Office Action for IN Application No. 968KOL2015, dated Jan. 8, 2019.

* cited by examiner

INTEGRATED COMPOSITE FILTER AND WATER PURIFICATION SYSTEM HAVING THE SAME

CROSS-REFERENCE TO RELATED APPLICATIONS

This application claims priority to and benefits of the following applications:
1) Chinese Patent Application Serial No. 201410814047.1, filed with the State Intellectual Property Office of P. R. China on Dec. 19, 2014,
2) Chinese Patent Application Serial No. 201420826203.1, filed with the State Intellectual Property Office of P. R. China on Dec. 19, 2014.

The entire content of the above applications are incorporated herein by reference.

FIELD

The present disclosure relates to a field of water purification, and more particularly to an integrated composite filter and a water purification system comprising the same.

BACKGROUND

A water purification equipment in the related art adopts a water system of a multi-stage filter, in which a pre-filter is made of a PP (polypropylene) cotton or activated carbon and connected with a RO (reverse osmosis) filter for water purification process. The whole system has a plurality of disadvantages, such as complex piping connections, inconvenient installation and replacement, multi-joint connection, and more potential leakage points.

SUMMARY

The present disclosure seeks to solve at least one of the problems existing in the related art to at least some extent.

For this, the present disclosure provides an integrated composite filter which has simple structure, and is convenient to replace.

The present disclosure further provides a water purification system including the integrated composite filter described above.

An integrated composite filter according to embodiments of a first aspect of the present disclosure includes: a shell defining a chamber therein, and defining a raw water inlet, a pretreated water outlet, a pretreated water inlet, a pure water outlet and a waste water outlet which are in communication with the chamber respectively; a pretreating filtering element disposed within the chamber; a filtering membrane disposed within the chamber. The pretreating filtering element and the filtering membrane are sequentially positioned between the raw water inlet and the pure water outlet as well as the waste water outlet, and the pretreating filtering element is positioned between the raw water inlet and the pretreated water outlet, and the filtering membrane is positioned between the pretreated water inlet and the pure water outlet as well as the waste water outlet.

With the integrated composite filter according to embodiments of the present disclosure, the pretreating filtering element is disposed between the raw water inlet and the pretreated water outlet, and the filtering membrane is disposed between the pretreated water inlet and the pure water outlet, the waste water outlet. The water filtered by the pretreating filtering element can be exhausted from the pretreated water outlet, then passes through the pretreated water inlet to be further filtered after passing through a booster device, each component of the integrated composite filter is disposed in the integrated composite filter, thus making the integrated composite filter more compact in structure, and easy to assemble.

In addition, the integrated composite filter according to embodiments of the present disclosure may further have the following additional technical features.

In some embodiments, the integrated composite filter further includes a central tube. The pretreating filtering element includes an installation tube configured as a hollow cylinder and a filtering assembly fitted over the installation tube, a water inlet channel communicated with the raw water inlet is defined between the filtering assembly and the shell, and a pretreated water outlet channel communicated with the pretreated water outlet is defined between the filtering assembly and the installation tube. The central tube is mounted within the installation tube, is spaced apart from the installation tube to define a filtering chamber communicated with the pretreated water inlet, and defines an end communicated with the pure water outlet and a water inlet hole in a sidewall of the central tube. The filtering membrane is disposed within the filtering chamber and around an outer peripheral wall of the central tube, a waste water channel communicated with the waste water outlet is defined between an outer peripheral wall of the filtering membrane and an inner peripheral wall of the installation tube.

In some embodiments, the pretreating filtering element includes first to third filtering layers sequentially fitted over the installation tube from outside to inside, the first filtering layer is constituted by a PP cotton, the second filtering layer is constituted by an activated carbon fiber winding layer, the third filtering layer is constituted by one of a PP cotton, a microfiltration membrane and an ultrafiltration membrane, a water inlet channel communicated with the raw water inlet being defined between the first filtering layer and the shell, a pretreated water outlet channel communicated with the pretreated water outlet being defined between the third filtering layer and the installation tube.

In some embodiments, the pretreating filtering element further includes: an upper end cover disposed around a periphery of an upper end of the installation tube; a lower end cover disposed around a periphery of a lower end of the installation tube, the filtering assembly being disposed between the upper end cover and the lower end cover; a supporting tube defining a plurality of through holes penetrated therethrough, and fitted over the installation tube and positioned between the upper end cover and the lower end cover, the filtering assembly being disposed between an outer peripheral surface of the installation tube and an inner peripheral surface of the supporting tube.

In some embodiments, the pretreating filtering element further includes: an inner tube defining a plurality of water passing holes penetrated therethrough, and fitted over the installation tube, an inner peripheral surface of the inner tube being spaced apart from the outer peripheral surface of the installation tube, the filtering assembly being fitted over the inner tube.

In some embodiments, the pretreating filtering element and the filtering membrane are formed in a nested manner.

In some embodiments, the pretreating filtering element and the filtering membrane are formed coaxially.

In some embodiments, the pretreating filtering element defines the filtering chamber therein, and is detachably inserted into the filtering chamber.

In some embodiments, the raw water inlet is configured as a single hole, the pretreated water outlet and the pretreated water inlet are formed in a nested manner, and the pretreated water inlet is nested within the pretreated water outlet.

In some embodiments, the pure water outlet and the waste water outlet are formed in a nested manner, and the pure water outlet is nested within the waste water outlet.

In some embodiments, the pretreated water outlet is formed in a lower portion of the shell and below the raw water inlet, the pure water outlet is formed at an upper portion of the shell, and an upper end of the central tube is open and communicated with the pure water outlet.

In some embodiments, the first filtering layer is constituted by a non-woven winding layer, and the third filtering layer is constituted by a CRN microfiltration membrane; or the first filtering layer is constituted by a PP cotton with a thickness of 5 microns, and the third filtering layer is constituted by a PP cotton with a thickness of 1 micron; or the first filtering layer is constituted by a winding PP cotton, and the third filtering layer is constituted by an ultrafiltration membrane.

In some embodiments, the filtering membrane is a reverse osmosis membrane, an ultrafiltration membrane or a nanofiltration membrane.

A water purification system according to embodiments of a second aspect of the present disclosure includes an integrated composite filter according to embodiments of the first aspect of the present disclosure.

In some embodiments, the water purification system further includes a booster pump, the booster pump defines a water inlet communicated with the pretreated water inlet and a water outlet communicated with the pretreated water outlet.

In some embodiments, the water purification system further includes a booster pump defining a water inlet communicated with the pretreated water outlet and a water outlet communicated with the pretreated water inlet.

In some embodiments, the water purification system further includes: a water suction pump communicated with the pure water outlet; and a water storage device disposed between the water suction pump and the pure water outlet.

In some embodiments, the water storage device is a flexible water bag. In some embodiments, a waste water ratio solenoid valve is disposed at the waste water outlet.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
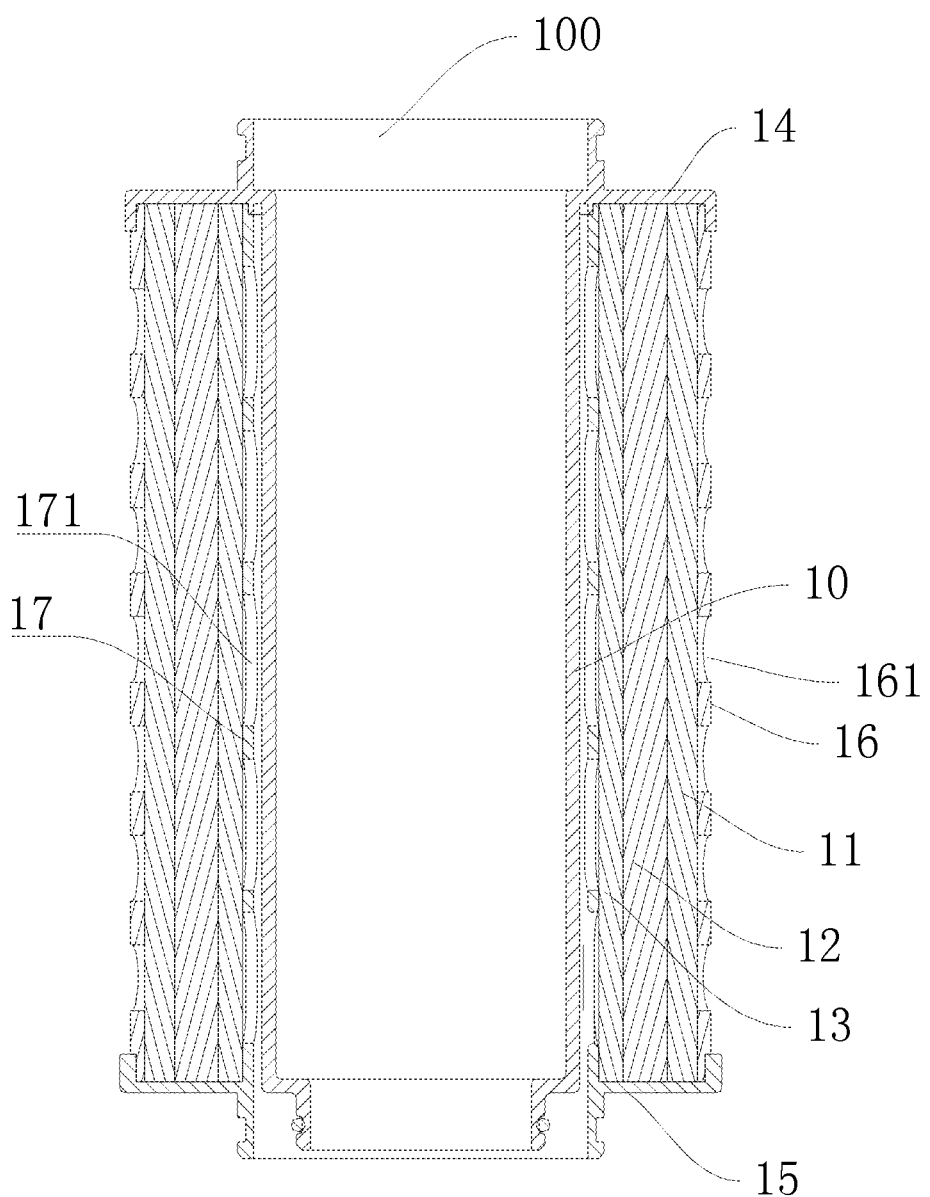
FIG. 1 is a sectional view of a pretreating filter according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it is to be understood that terms such as "central," "longitudinal," "lateral," "length," "width," "thickness," "upper," "lower," "vertical," "horizontal," "top," "bottom," "inner," "outer," should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, "a plurality of" means two or more than two, unless specified otherwise.

In the description of the present disclosure, it should be understood that, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Figure 2:
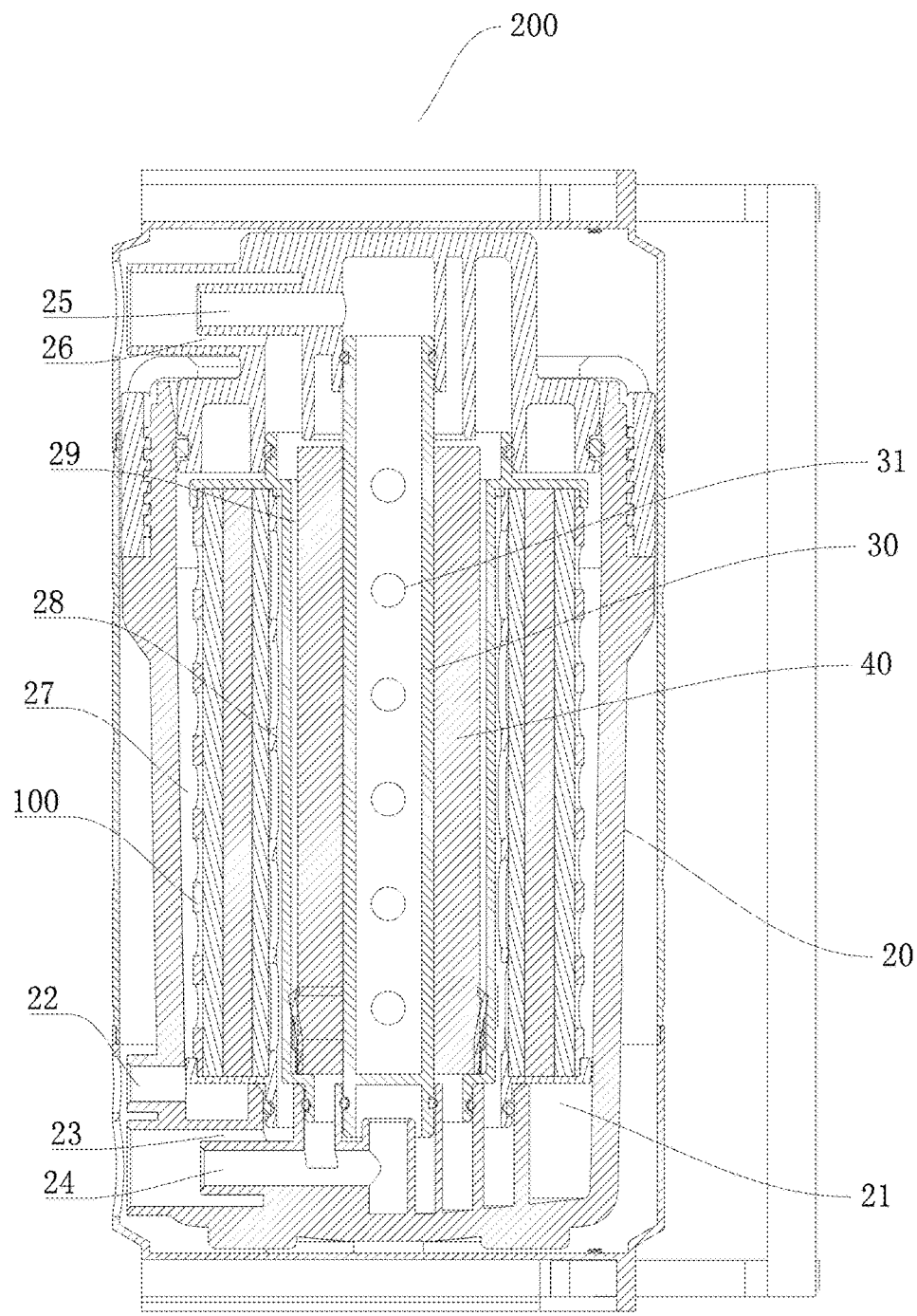
FIG. 2 is a sectional view of an integrated composite filter according to an embodiment of the present disclosure.
Figure 3:
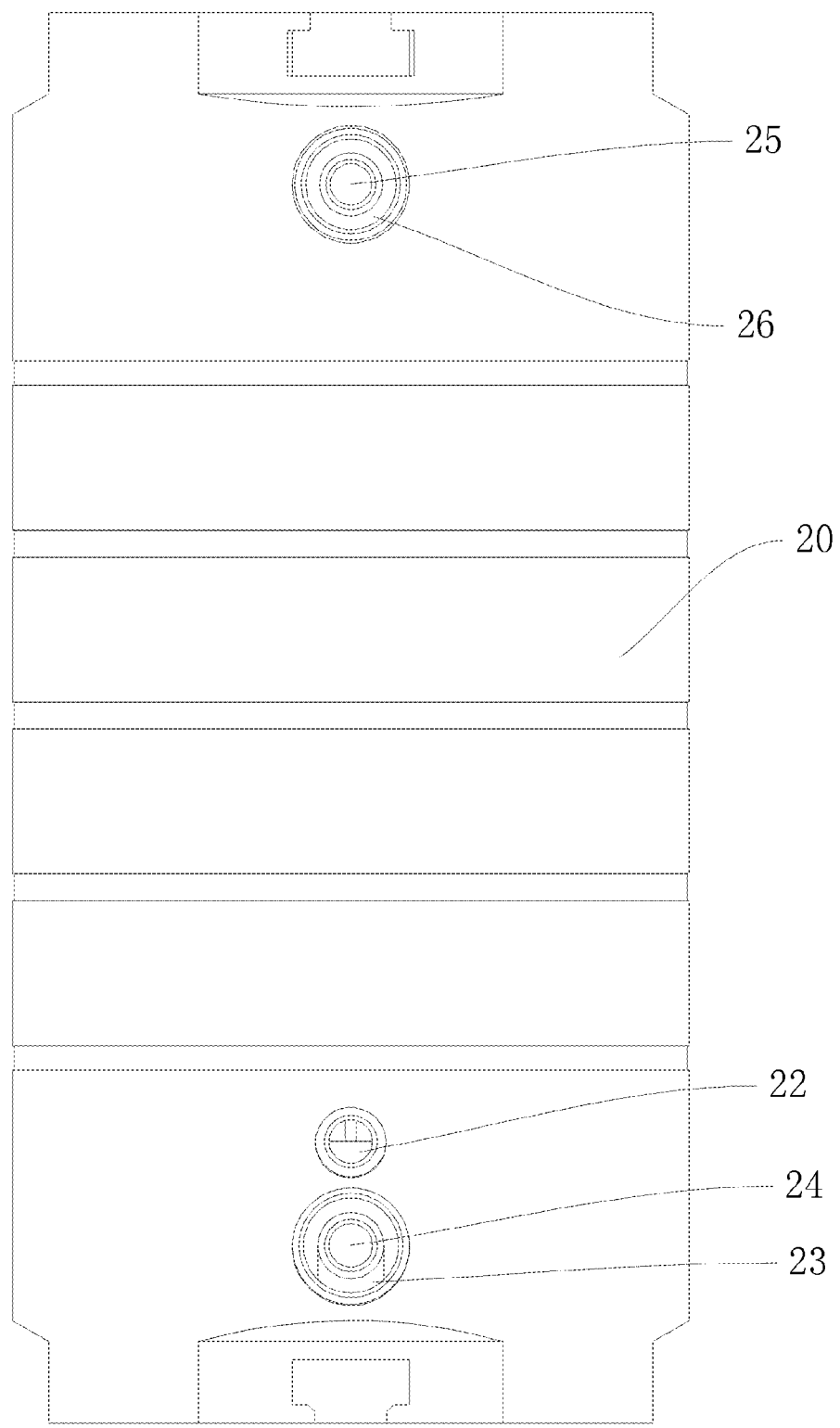
FIG. 3 is a front view of an integrated composite filter according to an embodiment of the present disclosure.
Figure 4:
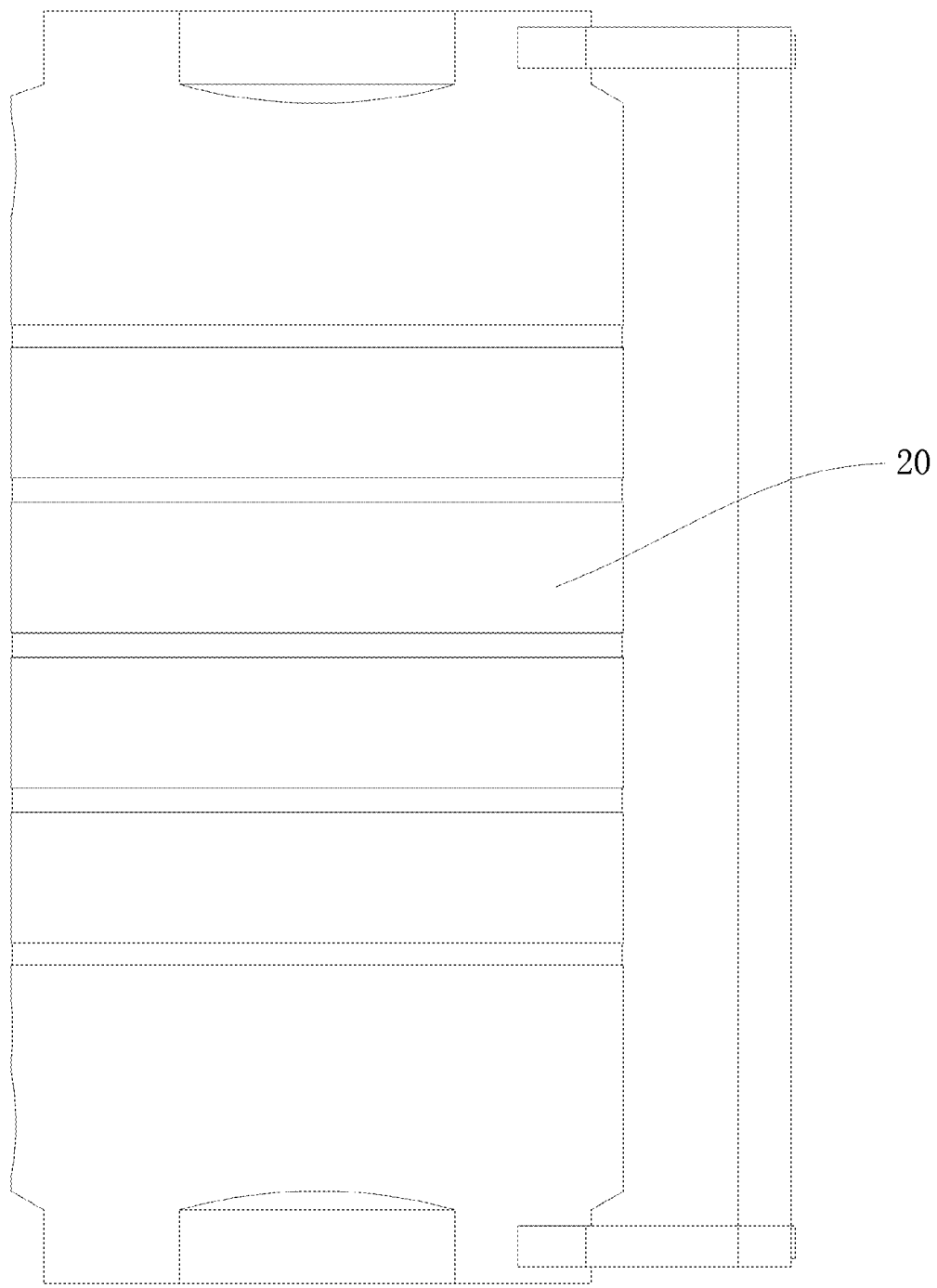
FIG. 4 is a side view of an integrated composite filter according to an embodiment of the present disclosure.
Figure 5:
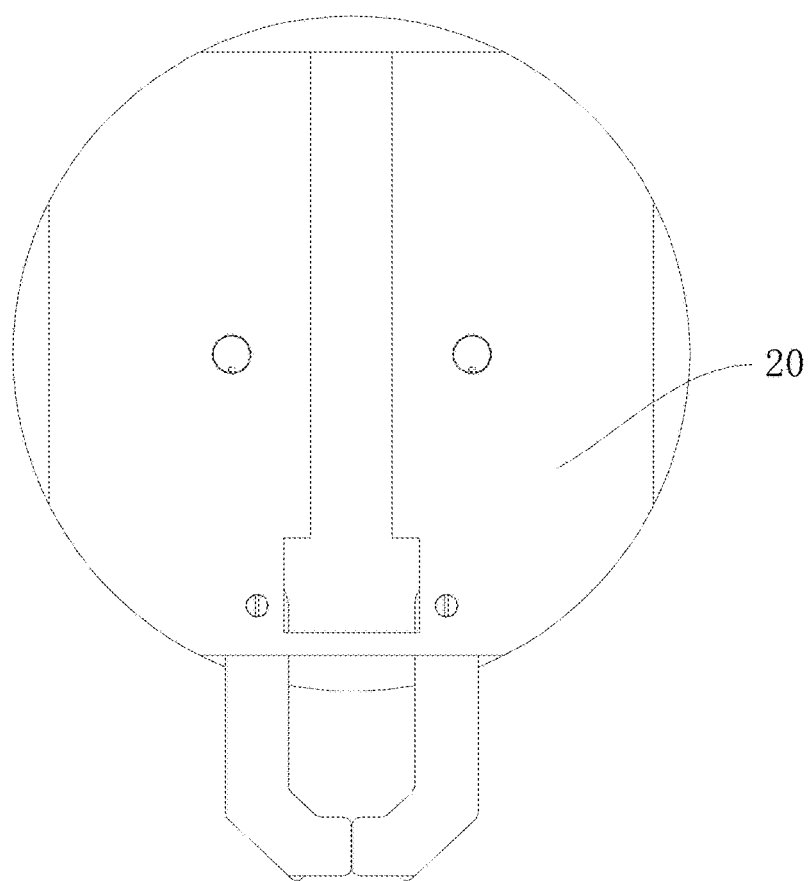
FIG. 5 is a top view of an integrated composite filter according to an embodiment of the present disclosure.

As shown in FIG. 2, an integrated composite filter 200 according to embodiments of the present disclosure includes: a shell 20, a pretreating filtering element 100 and a filtering membrane 40. The shell 20 defines a chamber 21 therein, and defines a raw water inlet 22, a pretreated water outlet 23, a pretreated water inlet 24, a pure water outlet 25 and a waste water outlet 26 which are in communication with the chamber 21 respectively. The pretreating filtering element 100 and the filtering membrane 40 are both disposed within the chamber 21, and sequentially positioned between the raw water inlet 22 and the pure water outlet 25 as well as the waste water outlet 26. The pretreating filtering element 100 is positioned between the raw water inlet 22 and the pretreated water outlet 23, and the filtering membrane 40 is positioned between the pretreated water inlet 24 and the pure water outlet 25 as well as the waste water outlet 26.

That is, from the view of an water flow direction, during a process of using the integrated composite filter 200, water sequentially passes through the raw water inlet 22, the pretreating filtering element 100 and the filtering membrane 40, then is divided into pure water and waste water at the filtering membrane 40, and flows out from the pure water outlet 25 and the waste water outlet 26, respectively.

Therefore, with the integrated composite filter 200 according to embodiments of the present disclosure, the pretreating filtering element 100 is disposed between the raw water inlet 22 and the pretreated water outlet 23, and the filtering membrane 40 is disposed between the pretreated water inlet 24 and the pure water outlet 25, the waste water outlet 26. The water filtered by the pretreating filtering element 100 can be exhausted from the pretreated water outlet 23, then passes through the pretreated water inlet 24 to be further filtered after passing through a booster device, each component of the integrated composite filter 200 is disposed in the integrated composite filter 200, thus making the integrated composite filter 200 more compact in structure, and easy to assemble.

In some embodiments, the integrated composite filter 200 further includes a central tube 30, the pretreating filtering element 100 includes an installation tube 10 and a filtering assembly, the installation tube 10 is configured as a hollow cylinder, the filtering assembly is fitted over the installation tube 10, a water inlet channel 27 communicated with the raw water inlet 22 is defined between the filtering assembly and the shell 20, and a pretreated water outlet channel 23 communicated with the pretreated water outlet 23 is defined between the filtering assembly and the installation tube 10.

The central tube 30 is mounted within the installation tube 10, is spaced apart from the installation tube 10 to define a filtering chamber communicated with the pretreated water inlet 24, and defines an end communicated with the pure water outlet 25 and a water inlet hole 31 in a sidewall of the central tube 30. The filtering membrane 40 is disposed within the filtering chamber and around an outer peripheral wall of the central tube 30, a waste water channel 29 communicated with the waste water outlet 26 is defined between an outer peripheral wall of the filtering membrane 40 and an inner peripheral wall of the installation tube 10.

First, the pretreating filtering element 100 according to embodiments of the present disclosure will be described below in detail with reference to the drawings.

The pretreating filtering element 100 according to embodiments of the present disclosure includes an installation tube 10 and a plurality of filtering layers, the installation tube 10 is configured as a hollow cylinder extended in an up-down direction, the plurality of filtering layers are sequentially fitted over the installation tube 10 from outside to inside. The plurality of filtering layers may be two filtering layers, and may also be three filtering layers, i.e. two or three filtering layers may be sequentially fitted over the installation tube 10 from outside to inside in a radial direction of the installation tube 10.

Therefore, as the plurality of filtering layers are sequentially fitted over the installation tube 10, the pretreating filtering element 100 according to embodiments of the present disclosure is simple in structure and easy to assembly, and the pretreating filtering element 100 is designed integrally, and can be replaced together all at once after the pretreating filtering element 100 expires, thus solving the problem of frequent replacement of different filters for consumers and reducing the cost.

When the plurality of filtering layers are two filtering layers, the plurality of filtering layers include a PP layer and an activated carbon layer from outside to inside, the PP layer is constituted by a PP cotton or a PP non-woven winding layer, the activated carbon layer is constituted by an activated carbon fiber winding layer or an activated carbon rod layer. The two filtering layers are simple in structure, convenient to wind, and easy to install and replace.

The pretreating filtering element 100 according to embodiments of the present disclosure will be described in detail in the following when the plurality of filtering layers are three filtering layers.

As shown in FIG. 1, the pretreating filtering element 100 according to embodiments of the present disclosure includes an installation tube 10, a first filtering layer 11, a second filtering layer 12 and a third filtering layer 13.

Specifically, the installation tube 10 is configured as a hollow cylinder extended in an up-down direction, the first filtering layer 11, the second filtering layer 12 and the third filtering layer 13 are cylindrical, and sequentially fitted over the installation tube 10 from outside to inside. The first filtering layer 11 is constituted by a PP cotton, the second filtering layer 12 is constituted by an activated carbon fiber winding layer, the third filtering layer 13 is constituted by one of a PP cotton, a microfiltration membrane or an ultrafiltration membrane.

In other words, the pretreating filtering element 100 according to embodiments of the present disclosure mainly consists of the installation tube 10 and three filtering layers sequentially fitted over the installation tube 10, the three filtering layers are the first filtering layer 11, the second filtering layer 12 and the third filtering layer 13 in turn from outside to inside in a radial direction of the installation tube 10. The first filtering layer 11 is constituted by a PP cotton, the second filtering layer 12 is constituted by an activated carbon fiber winding layer, the third filtering layer 13 is constituted by one of a PP cotton, a microfiltration membrane or an ultrafiltration membrane.

That is, the pretreating filtering element 100 does not include an adsorption structure which may produce fine carbon powders, and does not need to be washed after initial installation since no fine carbon powders flow out. The plurality of filtering layers are integrally disposed on the installation tube 10 respectively, and have basically identical service life, and thus can be replaced together after the pretreating filtering element 100 expires.

Therefore, the pretreating filtering element 100 according to embodiments of the present disclosure is configured as such a structure which consists of the first to third filtering layers without fine carbon powders. The pretreating filtering element 100 with such a simple structure does not need to be washed during initial installation since no fine carbon powders flow out. The pretreating filtering element 100 is designed integrally, and can be replaced together all at once after the pretreating filtering element 100 expires, thus solving the problem of frequent replacement of different filters for consumers and reducing the cost.

In some embodiments, the pretreating filtering element 100 further includes: an upper end cover 14, a lower end cover 15 and a supporting tube 16. Specifically, the upper end cover 14 is disposed at a periphery of an upper end of the installation tube 10, the lower end cover 15 is disposed at a periphery of a lower end of the installation tube 10, in which the first filtering layer 11, the second filtering layer 12 and the third filtering layer 13 are disposed between the upper end cover 14 and the lower end cover 15. The supporting tube 16 is fitted over the installation tube 10 and positioned between the upper end cover 14 and the lower end cover 15, in which the first filtering layer 11, the second filtering layer 12 and the third filtering layer 13 are disposed between an outer peripheral surface of the installation tube 10 and an inner peripheral surface of the supporting tube 16, the supporting tube 16 defines a plurality of through holes 161 penetrated therethrough.

As shown in FIG. 1, the pretreating filtering element 100 includes the installation tube 10, the upper end of the installation tube 10 is provided with the upper end cover 14 extended in the radical direction of the installation tube 10, the lower end of the installation tube 10 is provided with the lower end cover 15 extended in the radical direction of the installation tube 10, the first filtering layer 11, the second filtering layer 12 and the third filtering layer 13 are disposed between the upper end cover 14 and the lower end cover 15, the supporting tube 16 is disposed outside the third filtering layer 13, and upper and lower ends of the supporting tube 16 are abutted against the upper end cover 14 and the lower end cover 15 respectively. Therefore, the pretreating filtering element 100 of such a structure can effectively ensure the overall structural stability on the basis of simple structure.

Further, in some embodiments, the pretreating filtering element 100 further includes: an inner tube 17 fitted over the installation tube 10, an inner peripheral surface of the inner tube 17 is spaced apart from the outer peripheral surface of the installation tube 10, upper and lower ends of the inner tube 17 are abutted against the upper end cover 14 and the lower end cover 15 respectively, the third filtering layer 13 is fitted over the inner tube 17, and the inner tube 17 defines a plurality of water passing holes 171 penetrated therethrough.

That is, the first filtering layer 11, the second filtering layer 12 and the third filtering layer 13 are not nested around the installation tube 10 directly, but nested around the inner tube 17. The inner tube 17 is fitted over the installation tube 10 and spaced apart from the installation tube 10 to define a pretreated water outlet channel 28, and the inner tube 17 defines a plurality of water passing holes 171 communicated with pretreated water outlet channel.

Specifically, when the pretreating filtering element 100 according to an embodiment of the present disclosure is used, the raw water enters the pretreating filtering element 100 via a plurality of through holes 161 in the supporting tube 16, and then enters the pretreated water outlet channel via the plurality of water passing holes 171 in the inner tube 17 after passing through the first filtering layer 11, the second filtering layer 12 and the third filtering layer 13 sequentially. Afterwards, the pretreated water pretreated by the pretreating filtering element 100 is exhausted from the pretreated water outlet channel, and may be further filtered.

In some embodiments, upper and lower end surfaces of the first filtering layer 11, the second filtering layer 12 and the third filtering layer 13 are abutted against the upper end cover 14 and the lower end cover 15 respectively, the installation tube 10 is integrally formed with the upper end cover 14, and the inner tube 17 is integrally formed with the lower end cover 15. Thus, the pretreating filtering element 100 has a plurality of advantages, such as more compact structure, molding convenience for each component, high stability, simplified assembly process, and reduced cost.

In some embodiments, the first filtering layer 11, i.e. the PP cotton, may be constituted by a PP non-woven winding layer, and may also be constituted by a folding PP non-woven or a winding PP cotton. The second filtering layer 12 is constituted by an activated carbon fiber winding layer, and may also be constituted by an activated carbon rod or may be made of a granular activated carbon, an acid activated carbon and other materials with adsorption function. The third filtering layer 13 may be constituted by a high precision microfiltration membrane or an ultrafiltration membrane.

Alternatively, in some embodiments, the first filtering layer 11 is a PP non-woven winding layer, and the third filtering layer 13 is a microfiltration membrane. In some specific embodiments, the first filtering layer 11 is constituted by a PP cotton with a thickness of 5 microns, and the third filtering layer 13 is constituted by a PP cotton with a thickness of 1 micron. In other specific embodiments, the first filtering layer 11 may also be constituted by a winding PP cotton, and the third filtering layer 13 is constituted by an ultrafiltration membrane.

Preferably, in some embodiments, an inner diameter of the third filtering layer 13 ranges from 60 mm to 70 mm, the difference between the inner diameter of the third filtering layer 13 and an outer diameter of the first filtering layer 11 ranges from 15 mm to 20 mm, and the height of the first filtering layer 11, the second filtering layer 12 and the third filtering layer 13 ranges from 100 mm to 110 mm in the up-down direction. Further, the inner diameter of the third filtering layer 13 is 65 mm, the difference between the inner diameter of the third filtering layer 13 and the outer diameter of the first filtering layer 11 is 18 mm, and the height of the first filtering layer 11, the second filtering layer 12 and the third filtering layer 13 is 106 mm in the up-down direction.

Therefore, the service life of the first filtering layer 11, the second filtering layer 12 and the third filtering layer 13 of the pretreating filtering element 100 with such a structure can be ensured to be as consistent as possible, and the first filtering layer 11, the second filtering layer 12 and the third filtering layer 13 can be replaced together after the pretreating filtering element 100 expires, thus solving the trouble of frequent replacement of different filters for consumers, ensuring that all the filtering layers are fully utilized, and avoiding the waste of a certain filtering layer.

The integrated composite filter 200 according to embodiments of the present disclosure will be described below in detail with reference to the drawings.

As shown in FIG. 2 to FIG. 8, the integrated composite filter 200 according to embodiments of the present disclosure includes a shell 20, a pretreating filtering element 100, a central tube 30 and a filtering membrane 40. The pretreating filtering element 100 is a pretreating filtering element 100 according to above embodiments of the present disclosure.

Specifically, the shell 20 defines a chamber 21 therein and is formed with a raw water inlet 22, a pretreated water outlet 23, a pretreated water inlet 24, a pure water outlet 25 and a waste water outlet 26 which are in communication with the chamber 21 respectively. The pretreating filtering element 100 is mounted within the chamber 21 and extended in an axial direction of the chamber 21, and includes the installation tube 10, the first filtering layer 11, the second filtering layer 12 and the third filtering layer 13 in above embodiments. A water inlet channel 27 communicated with the raw water inlet 22 is defined between the first filtering layer 11 and the shell 20, and a pretreated water outlet channel 28 communicated with the pretreated water outlet 23 is defined between the third filtering layer 13 and the installation tube 10.

The central tube 30 is mounted within the installation tube 10 and extended in the axial direction of the installation tube 10, and spaced apart from the installation tube 10 to define a filtering chamber communicated with the pretreated water inlet 24, a first end of the central tube 30 is communicated with the pure water outlet 25, the central tube 30 defines a plurality of water inlet holes 31 in a sidewall thereof. The filtering membrane 40 is disposed within the filtering chamber and around an outer peripheral wall of the central tube 30. A waste water channel 29 is defined between an outer peripheral wall of the filtering membrane 40 and an inner peripheral wall of the installation tube 10, and is communicated with the waste water outlet 26.

That is, the integrated composite filter 200 according to embodiments of the present disclosure adopts the pretreating filtering element 100 which consists of the first to third filtering layers without fine carbon powders, the pretreating filtering element 100 can pretreat the raw water, the pretreated water can be filtered again by the filtering membrane 40, such that the pretreatment is combined with post-treatment to ensure the water purification effect.

As the pretreating filtering element 100 according to embodiments of the present disclosure has above technical effects, the integrated composite filter 200 according to embodiments of the present disclosure also has corresponding technical effects, i.e. the pretreating filtering element 100 has simple structure, and does not need to be washed during initial installation since no fine carbon powders flow out; the pretreating filtering element 100 is designed integrally, and can be replaced together all at once after the pretreating filtering element 100 expires, thus solving the problem of frequent replacement of different filters for consumers and reducing the cost.

In addition, the pretreating filtering element 100 and the filtering membrane 40 constitute the integrated composite filter 200, and the pretreating filtering element 100 and the filtering membrane 40 may have basically identical service life and may also be replaced together, the pretreating filtering element 100 is connected with the filtering membrane 40, thereby making the structure compact, with less potential leakage points between pretreatment and post-treatment components, thus ensuring the whole performance of the integrated composite filter 200.

In some embodiments, the pretreating filtering element 100 further includes: an upper end cover 14, a lower end cover 15 and a supporting tube 16. Specifically, the upper end cover 14 is disposed at a periphery of an upper end of the installation tube 10, the lower end cover 15 is disposed at a periphery of a lower end of the installation tube 10, in which the first filtering layer 11, the second filtering layer 12 and the third filtering layer 13 are disposed between the upper end cover 14 and the lower end cover 15. The supporting tube 16 is fitted over the installation tube 10 and positioned between the upper end cover 14 and the lower end cover 15, in which the first filtering layer 11, the second filtering layer 12 and the third filtering layer 13 are disposed between an outer peripheral surface of the installation tube 10 and an inner peripheral surface of the supporting tube 16, the supporting tube 16 defines a plurality of through holes 161 penetrated therethrough.

In some specific embodiments of the present disclosure, the filtering membrane 40 is wound around the central tube 30, an upper end of the central tube 30 defines the pure water outlet 25 and an upper pretreated water inlet hole communicated with an upper end of the filtering membrane 40, a lower end of the central tube 30 defines a lower pretreated water inlet hole communicated with a lower end of the filtering membrane 40, the central tube 30 defines a water inlet hole 31 communicated with the filtering membrane 40 in a sidewall of the central tube 30, and a pure water outlet channel communicating the water inlet hoe 31 with the pure water outlet 25.

Specifically, the pretreating filtering element 100 is positioned between the pure water inlet 22 and the pretreated water outlet 23, the filtering membrane 40 is positioned between the pretreated water inlet 24 and the pure water outlet 25 as well as the waste water outlet 26. The upper pretreated water inlet hole and the lower pretreated water inlet hole are communicated with the pretreated water inlet 24 respectively.

The integrated composite filter 200 according to embodiments of the present disclosure can replace the multi-stage filter of the water purification system in the related art by integrating the pretreating filtering element 100 with the filtering membrane 40, such that not only can the tube connection be simplified, the installation and replacement is more convenient, but also the amount of the joints and thus the potential leakage points can be reduced. Moreover, the integrated composite filter 200 after integrating the pretreating filtering element 100 with the filtering membrane 40 enables the pretreating filtering element 100 and the filtering membrane 40 to have basically identical service life, thus eliminating the problem of frequent replacement of filters and dramatically decreasing the usage cost.

In addition, since the central tube 30 is formed with the upper pretreated water inlet hole and the lower pretreated water inlet hole, the pretreated water after boosted can flow into the filtering membrane 40 to be filtered from the upper end and the lower end of the central tube 30 at the same time, thereby the amount of water can be increased by increasing the water flow capacity, thus satisfying the requirement of drinking while filtering. Therefore, the integrated composite filter 200 according to embodiments of the present disclosure integrated with a plurality of water purification filter materials can simplify the tube connection, installation and replacement of the water purification system with less potential leakage points, can improve the user experience, decrease the usage cost, have large flow capacity, and satisfy the requirement of drinking while filtering.

The pretreating filtering element 100 further includes the inner tube 17 which is fitted over the installation tube 10, and the inner peripheral surface of the inner tube 17 is spaced apart from the outer peripheral surface of the installation tube 10, the upper and lower ends of the inner tube 17 are abutted against the upper end cover 14 and the lower end cover 15 respectively, the third filtering layer 13 is fitted over the inner tube 17 which defines the plurality of water passing holes 171 penetrated therethrough.

Specifically, the integrated composite filter 200 according to embodiments of the present disclosure is mainly constituted by the shell 20, the pretreating filtering element 100, the central tube 30 and the filtering membrane 40, in which the pretreating filtering element 100 is mounted within the shell 20, the water inlet channel 27 is defined between the supporting tube 161 of the pretreating filtering element 100 and the shell 20, the water inlet channel 27 is communicated with the raw water inlet 22, the raw water entering the shell 20 from the raw water inlet 22 enters the water inlet channel 27 first.

Figure 6:
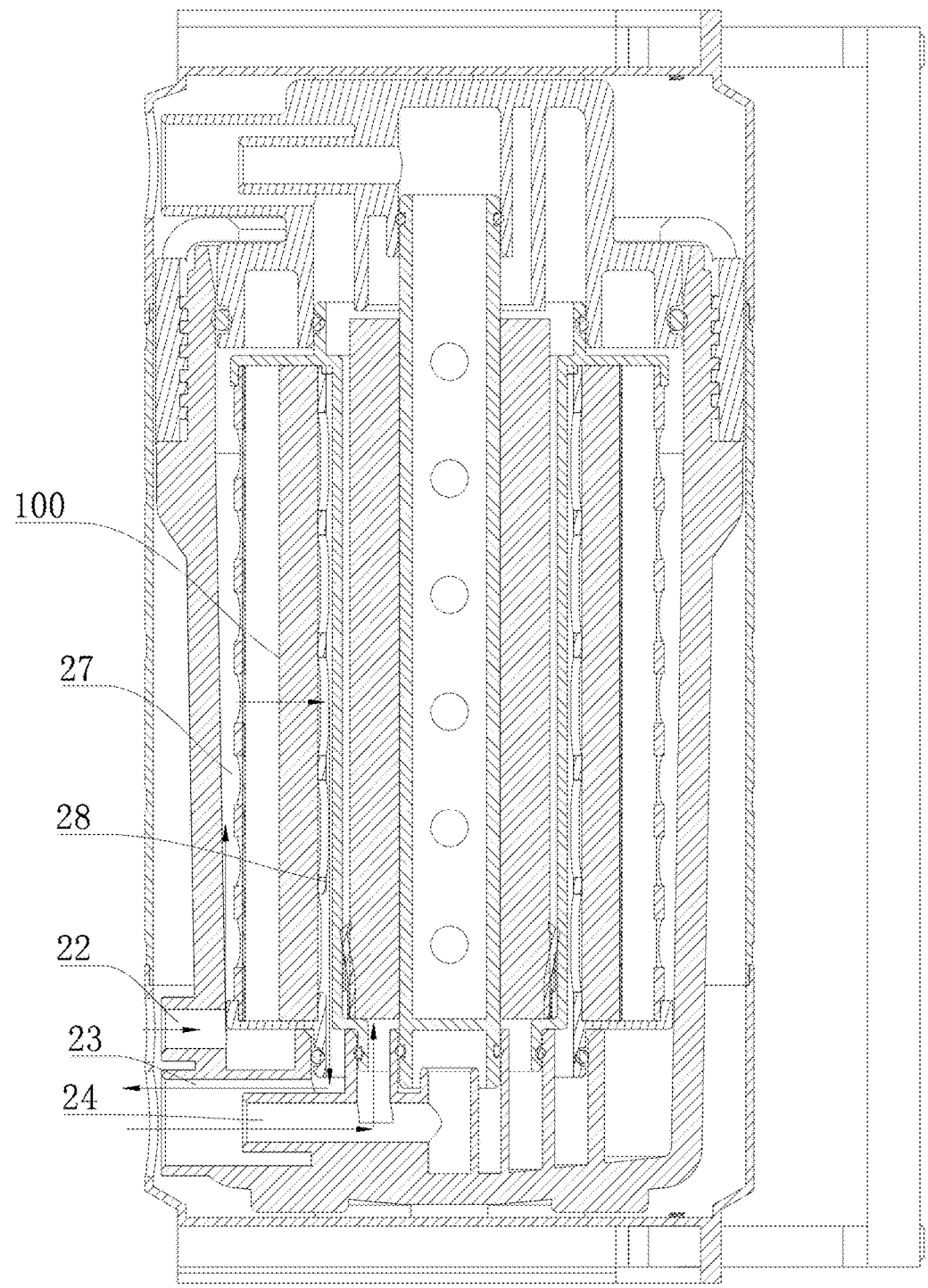
FIG. 6 is a schematic view of an integrated composite filter according to an embodiment of the present disclosure showing a water inflow process.
Figure 7:
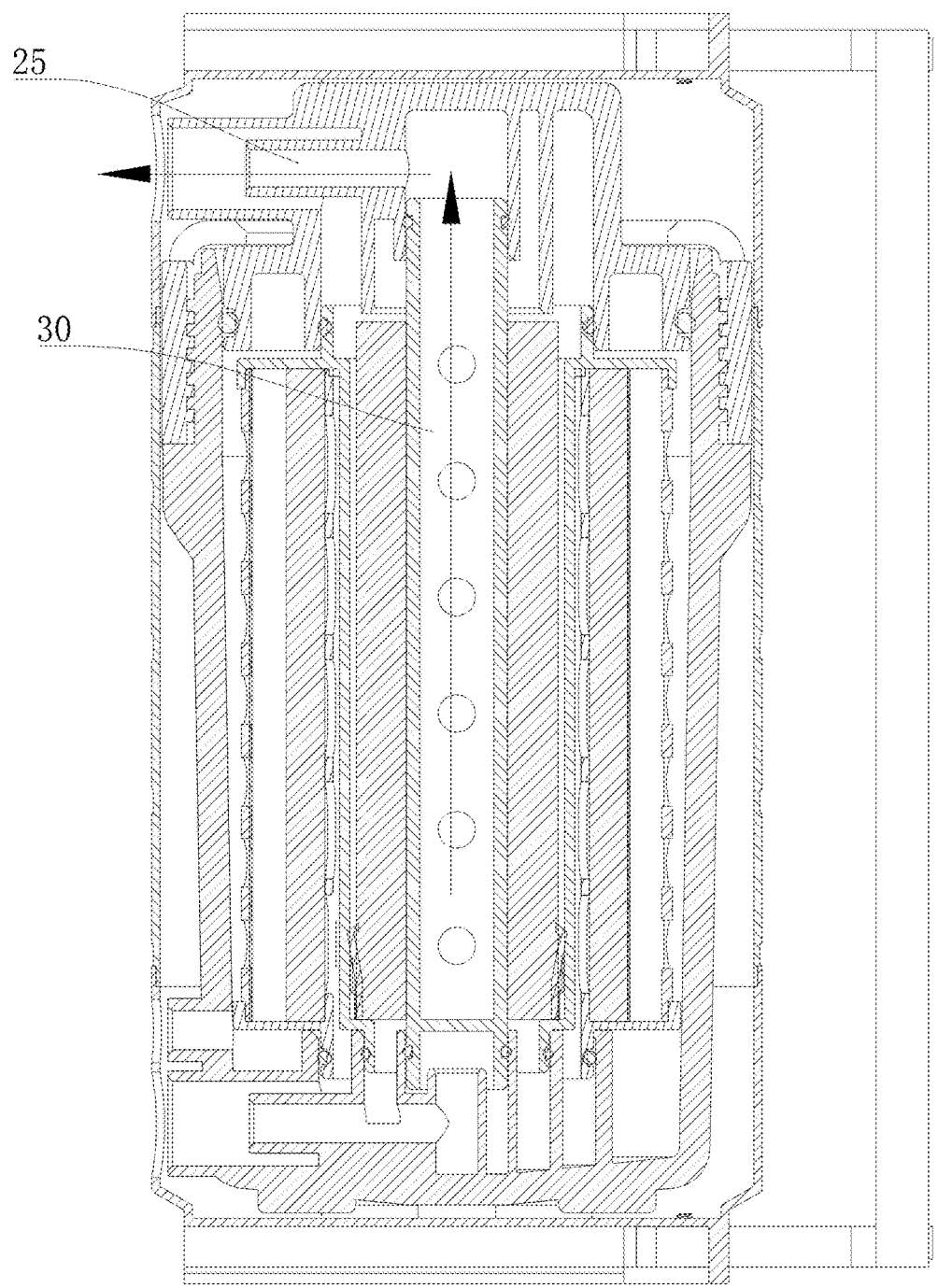
FIG. 7 is a schematic view of an integrated composite filter according to an embodiment of the present disclosure showing a pure water outflow process.
Figure 8:
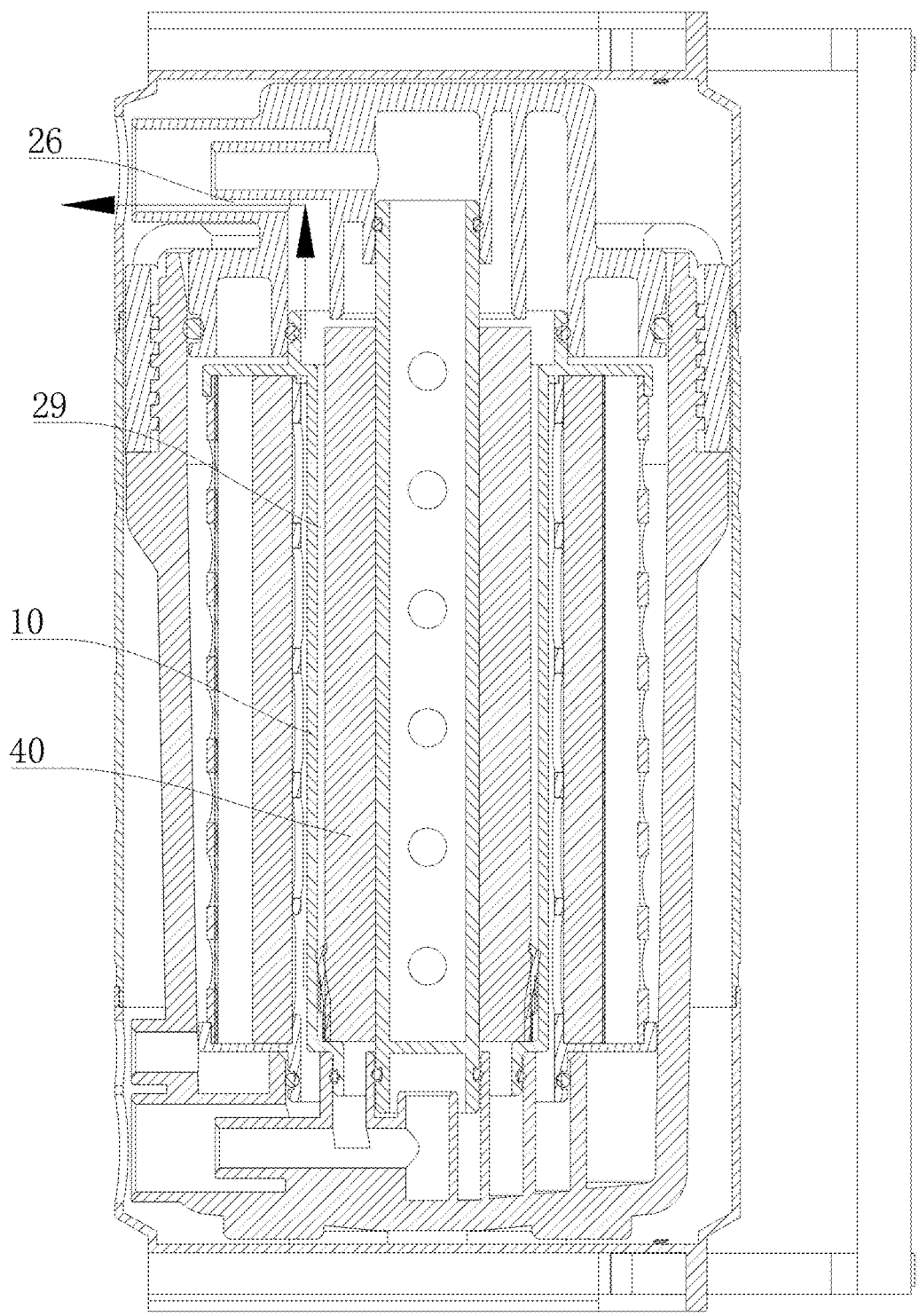
FIG. 8 is a schematic view of an integrated composite filter according to an embodiment of the present disclosure showing a waste water outflow process.

The supporting tube 16 of the pretreating filtering element 100 defines the plurality of through holes 161, the raw water in the water inlet channel 27 sequentially enters the first filtering layer 11, the second filtering layer 12 and the third filtering layer 13 via the plurality of through holes 161, the pretreated water pretreated by the first filtering layer 11, the second filtering layer 12 and the third filtering layer 13 enters the pretreated water outlet channel 28 between the inner tube 17 and the installation tube 10 from the plurality of water passing holes 171 in the inner tube 17, the pretreated water outlet channel 28 is communicated with the pretreated water outlet 23, the pretreated water may flow out from the pretreated water outlet 23 (as indicated by arrows in FIG. 6).

The pretreated water flowing out from the pretreated water outlet 23 may be boosted by a booster device, and the boosted pretreated water then enters the shell 20 from the pretreated water inlet 24, and enters the filtering chamber between the central tube 30 and the installation tube 10 (as indicated by arrows in FIG. 6). The pretreated water filtered by the filtering membrane 40 is divided into pure water and waste water. The pure water enters the central tube 30 from the water inlet holes 31 in the central tube 30 and then flows out from the pure water outlet 25 (as indicated by arrows in FIG. 7). The waste water flows out from the waste water outlet 26 after passing through the waste water channel 29 between the filtering membrane 40 and the installation tube 10 to complete the discharge of the waste water (as indicated by arrows in FIG. 8).

Therefore, the integrated composite filter 200 according to embodiments of the present disclosure has reasonable structure. Since the pretreating filtering element 100 has no granular activated carbon, there are no fine carbon powders flowing out during initial installation, and thereby the whole integrated composite filter 200 does not need to be washed for a long time, thus simplifying the installation procedure.

In some embodiments, the pretreating filtering element 100 and the filtering membrane 40 are formed in a nested manner. The pretreating filtering element 100 may be disposed at an outside of the filtering membrane 40, and may also be disposed at an inside of the filtering membrane 40. In some embodiments of the present disclosure, the pretreating filtering element 100 is preferably disposed at the outside of the filtering membrane 40, thus facilitating the fitting of the pretreating filtering element 100 with other structures.

Further, in some specific embodiments of the present disclosure, the pretreating filtering element 100 and the filtering membrane 40 are formed coaxially. Preferably, the pretreating filtering element 100 defines the filtering chamber therein, and can be detachably inserted into the filtering chamber. Therefore, an assembly of the pretreating filtering element 100 of such a structure, the filtering membrane 40 and the shell 20 is more reasonable in structure and more convenient to perform.

In some embodiments, the raw water inlet 22 is configured as a single hole, the pretreated water outlet 23 and the pretreated water inlet 24 are formed in a nested manner, and the pretreated water inlet 24 is nested within the pretreated water outlet 23. Further, the pure water outlet 25 and the waste water outlet 26 are formed in a nested manner, and the pure water outlet 25 is nested within the waste water outlet 26.

That is, in the shell 20 of the integrated composite filter 200 according to embodiments of the present disclosure, except that the raw water inlet 22 is configured as a single hole, the pretreated water outlet 23 and the pretreated water inlet 24 are formed in a nested manner, and the pure water outlet 25 and the waste water outlet 26 are formed in a nested manner, i.e. the pretreated water inlet 24 is nested within the pretreated water outlet 23, and the pure water outlet 25 is nested within the waste water outlet 26.

Therefore, individual tubes of the integrated composite filter 200 of such a structure are fitted with each other more conveniently, thus reducing the joints connected with an outside and leakage points. Moreover, the individual water paths of the integrated composite filter 200 are distributed more reasonably, thus enabling the overall structure of the integrated composite filter 200 to be more compact, which facilitates the miniaturization design of the integrated composite filter 200.

In some embodiments, the pretreated water outlet 23 is formed in a lower portion of the shell 20 and below the raw water inlet 22, the pure water outlet 25 is formed at an upper portion of the shell 20, an upper end of the central tube 30 is open and communicated with the pure water outlet 25.

That is, the pretreated water outlet 23 and the pretreated water inlet 24 formed in a nested manner are positioned near the lower portion of the shell 20, and the pure water outlet 25 and the waste water outlet 26 formed in a nested manner are positioned near the upper portion of the shell 20, the raw water inlet 22 is formed above the pretreated water outlet 23 and the pretreated water inlet 24.

When the integrated composite filter 200 of such a structure is used, the raw water enters the shell 20 from the raw water inlet 22 at the lower portion of the shell 20, and then flows out from the outer hole, i.e. the pretreated water outlet 23, of the nested composite holes at a lower portion of the integrated composite filter 200 after being filtered by the first filtering layer 11, the second filtering layer 12 and the third filtering layer 13. Then, the pretreated water enters the shell 20 from the pretreated water inlet 24 after being pressurized. Afterwards, the pretreated water flows upwardly from a bottom of the integrated composite filter 200 and enters the filtering chamber, and is filtered by the filtering membrane 40 to divide the pretreated water into pure water and waste water, and the pure water and the waste water are exhausted from the pure water outlet 25 and the waste water outlet 26 respectively.

Therefore, the water path of the integrated composite filter 200 of such a structure is designed more reasonably, which facilitates the flow and filtration of the raw water, thus improving the water purification efficiency of the integrated composite filter 200.

In some embodiments, the filtering membrane 40 may be a reverse osmosis membrane, an ultrafiltration membrane or a nanofiltration membrane. Therefore, the filtering membrane 40 not only is convenient to assemble, but can reasonably control the cost of the integrated composite filter 200 on the basis of guaranteeing the filtering effect.

Figure 9:
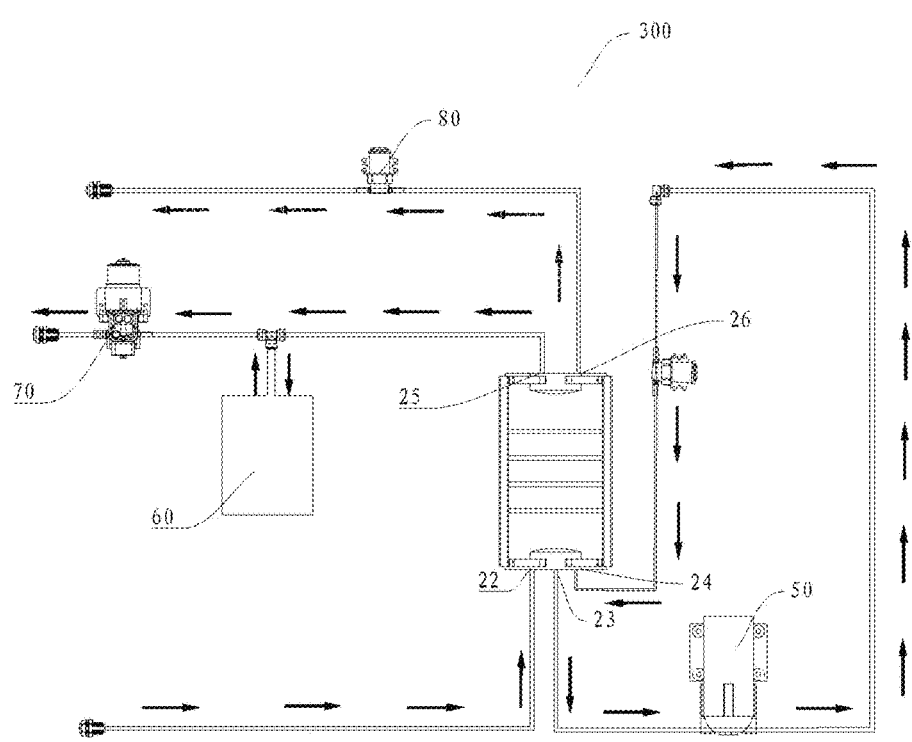
FIG. 9 is a water path diagram of a water purification apparatus according to an embodiment of the present disclosure.

As shown in FIG. 9, the water purification system 300 according to embodiments of the present disclosure includes the integrated composite filter 200 according to above embodiments of the present disclosure. As the integrated composite filter 200 according to embodiments of the present disclosure has above technical effects, the water purification system 300 according to embodiments of the present disclosure also has corresponding technical effects, i.e. the water purification system 300 has a compact overall structure and less leakage points, and does not need to be washed during initial installation, and individual filtering layers of the integrated composite filter 200 have basically identical service life and can be replaced together all at once, such that the water purification system 300 is easy for consumers to use.

In some embodiments, the water purification system 30 further includes a booster pump 50, the booster pump 50 defines a water inlet communicated with the pretreated water outlet 23 and a water outlet communicated with the pretreated water inlet 24. That is, the booster pump 50 is disposed between the pretreated water outlet 23 and the pretreated water inlet 24, the pretreated water flowing out from the pretreated water outlet 23 can enter the pretreated water inlet 24 after being boosted by the booster pump 50 to be further filtered, thus improving water purification effect.

In some specific embodiments of the present disclosure, the pure water outlet 25 is communicated with a water suction pump 70, a water storage device is disposed between the water suction pump 70 and the pure water outlet 25. Preferably, the water storage device is a flexible water bag 60. Further, a waste water ratio solenoid valve 80 is disposed at the waste water outlet 26.

The pure water flowing out from the pure water outlet 25 can enter the flexible water bag 60, a micro-switch or a reed of the flexible water bag 60 gives a signal to a control board of the water purification system 300 after the flexible water bag 60 is full of the pure water, then the control board gives a signal to close the booster pump 50 and a switch at the raw water inlet 22, thus making the water purification system 300 stop working.

Other components and operations of the water purification system 300 according to embodiments of the present disclosure are well known to those skilled in the art and will not be described in detail herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An integrated composite filter, comprising:
   a shell defining a chamber therein, and defining a raw water inlet, a pretreated water outlet, a pretreated water inlet, a pure water outlet and a waste water outlet which are in communication with the chamber respectively;
   a pretreating filtering element disposed within the chamber;
   a filtering membrane disposed within the chamber;
   a central tube;
   wherein the pretreating filtering element and the filtering membrane are sequentially positioned between the raw water inlet and the pure water outlet as well as the waste water outlet, and the pretreating filtering element is positioned between the raw water inlet and the pretreated water outlet, and the filtering membrane is positioned between the pretreated water inlet and the pure water outlet as well as the waste water outlet;
   wherein pretreated water is exhausted from the shell through the pretreated water outlet and reenters the shell through the pretreated water inlet;
   wherein the raw water inlet is configured as a single hole, the pretreated water outlet and the pretreated water inlet are formed in a nested manner, and the pretreated water inlet is nested within the pretreated water outlet;
   wherein the pretreating filtering element comprises an installation tube configured as a hollow cylinder and a filtering assembly fitted over the installation tube, a water inlet channel communicated with the raw water inlet is defined between the filtering assembly and the shell, and a pretreated water outlet channel communicated with the pretreated water outlet is defined between the filtering assembly and the installation tube;
   wherein the central tube is mounted within the installation tube, is spaced apart from the installation tube to define a filtering chamber communicated with the pretreated water inlet, and defines an end communicated with the pure water outlet and a water inlet hole in a sidewall of the central tube;
   wherein the filtering membrane is disposed within the filtering chamber and around an outer peripheral wall of the central tube, a waste water channel communicated with the waste water outlet is defined between an outer peripheral wall of the filtering membrane and an inner peripheral wall of the installation tube;
   wherein the pretreated water outlet is formed in a lower portion of the shell and below the raw water inlet, the pure water outlet is formed at an upper portion of the shell, and an upper end of the central tube is open and communicated with the pure water outlet.

2. The integrated composite filter according to claim 1, wherein the pretreating filtering element comprises first to third filtering layers sequentially fitted over the installation tube from outside to inside, the first filtering layer is constituted by a polypropylene ("PP") cotton, the second filtering layer is constituted by an activated carbon fiber winding layer, the third filtering layer is constituted by one of a PP cotton, a microfiltration membrane and an ultrafiltration membrane, the water inlet channel communicated with the raw water inlet being further defined between the first filtering layer and the shell, the pretreated water outlet channel communicated with the pretreated water outlet being further defined between the third filtering layer and the installation tube.

3. The integrated composite filter according to claim 1, wherein the pretreating filtering element further comprises:
   an upper end cover disposed around a periphery of an upper end of the installation tube;
   a lower end cover disposed around a periphery of a lower end of the installation tube, the filtering assembly being disposed between the upper end cover and the lower end cover;
   a supporting tube defining a plurality of through holes penetrated therethrough, and fitted over the installation tube and positioned between the upper end cover and the lower end cover, the filtering assembly being disposed between an outer peripheral surface of the installation tube and an inner peripheral surface of the supporting tube.

4. The integrated composite filter according to claim 3, wherein the pretreating filtering element further comprises:
   an inner tube defining a plurality of water passing holes penetrated therethrough, and fitted over the installation tube, an inner peripheral surface of the inner tube being spaced apart from the outer peripheral surface of the installation tube, the filtering assembly being fitted over the inner tube.

5. The integrated composite filter according to claim 1, wherein the pretreating filtering element and the filtering membrane are formed in a nested manner.

6. The integrated composite filter according to claim 5, wherein the pretreating filtering element and the filtering membrane are formed coaxially.

7. The integrated composite filter according to claim 5, wherein the pretreating filtering element defines a filtering chamber therein, and is detachably inserted into the filtering chamber.

8. The integrated composite filter according to claim 1, wherein the pure water outlet and the waste water outlet are formed in a nested manner, and the pure water outlet is nested within the waste water outlet.

9. The integrated composite filter according to claim 2, wherein the first filtering layer is constituted by a non-woven winding layer, and the third filtering layer is constituted by a microfiltration membrane; or
wherein the first filtering layer is constituted by a PP cotton with a thickness of 5 microns, and the third filtering layer is constituted by a PP cotton with a thickness of 1 micron; or
wherein the first filtering layer is constituted by a winding PP cotton, and the third filtering layer is constituted by an ultrafiltration membrane.

10. The integrated composite filter according to claim 1, wherein the filtering membrane is a reverse osmosis membrane, an ultrafiltration membrane or a nanofiltration membrane.

11. A water purification system, comprising:
an integrated composite filter comprising:
a shell defining a chamber therein, and defining a raw water inlet, a pretreated water outlet, a pretreated water inlet, a pure water outlet and a waste water outlet which are in communication with the chamber respectively;
a pretreating filtering element disposed within the chamber;
a filtering membrane disposed within the chamber;
a central tube;
wherein the pretreating filtering element and the filtering membrane are sequentially positioned between the raw water inlet and the pure water outlet as well as the waste water outlet, and the pretreating filtering element is positioned between the raw water inlet and the pretreated water outlet, and the filtering membrane is positioned between the pretreated water inlet and the pure water outlet as well as the waste water outlet; and
a booster pump;
wherein pretreated water is exhausted from the shell through the pretreated water outlet and reenters the shell through the pretreated water inlet;
wherein the raw water inlet is configured as a single hole, the pretreated water outlet and the pretreated water inlet are formed in a nested manner, and the pretreated water inlet is nested within the pretreated water outlet;
wherein the pretreating filtering element comprises an installation tube configured as a hollow cylinder and a filtering assembly fitted over the installation tube, a water inlet channel communicated with the raw water inlet is defined between the filtering assembly and the shell, and a pretreated water outlet channel communicated with the pretreated water outlet is defined between the filtering assembly and the installation tube;
wherein the central tube is mounted within the installation tube, is spaced apart from the installation tube to define a filtering chamber communicated with the pretreated water inlet, and defines an end communicated with the pure water outlet and a water inlet hole in a sidewall of the central tube;
wherein the filtering membrane is disposed within the filtering chamber and around an outer peripheral wall of the central tube, a waste water channel communicated with the waste water outlet is defined between an outer peripheral wall of the filtering membrane and an inner peripheral wall of the installation tube;
wherein the pretreated water outlet is formed in a lower portion of the shell and below the raw water inlet, the pure water outlet is formed at an upper portion of the shell, and an upper end of the central tube is open and communicated with the pure water outlet.

12. The water purification system according to claim 11, further comprising:
a water suction pump communicated with the pure water outlet; and
a water storage device disposed between the water suction pump and the pure water outlet.

13. The water purification system according to claim 12, wherein the water storage device is a flexible water bag.

14. The water purification system according to claim 11, wherein a waste water ratio solenoid valve is disposed at the waste water outlet.

15. The water purification system according to claim 11, wherein the pretreating filtering element comprises first to third filtering layers sequentially fitted over the installation tube from outside to inside, the first filtering layer is constituted by a PP cotton, the second filtering layer is constituted by an activated carbon fiber winding layer, the third filtering layer is constituted by one of a PP cotton, a microfiltration membrane and an ultrafiltration membrane, a water inlet channel communicated with the raw water inlet being defined between the first filtering layer and the shell, a pretreated water outlet channel communicated with the pretreated water outlet being defined between the third filtering layer and the installation tube.

16. An integrated composite filter, comprising:
a shell defining a chamber therein, and defining a raw water inlet, a pretreated water outlet, a pretreated water inlet, a pure water outlet and a waste water outlet which are in communication with the chamber respectively;
a pretreating filtering element disposed within the chamber;
a filtering membrane disposed within the chamber;
a central tube,
wherein the pretreating filtering element comprises an installation tube configured as a hollow cylinder and a filtering assembly fitted over the installation tube, a water inlet channel communicated with the raw water inlet is defined between the filtering assembly and the shell, and a pretreated water outlet channel communicated with the pretreated water outlet is defined between the filtering assembly and the installation tube;
wherein the central tube is mounted within the installation tube, is spaced apart from the installation tube to define a filtering chamber communicated with the pretreated water inlet, and defines an end communicated with the pure water outlet and a water inlet hole in a sidewall of the central tube;
wherein the filtering membrane is disposed within the filtering chamber and around an outer peripheral wall of the central tube, a waste water channel communicated with the waste water outlet is defined between an outer peripheral wall of the filtering membrane and an inner peripheral wall of the installation tube wherein the pretreating filtering element and the filtering membrane are sequentially positioned between the raw water inlet and the pure water outlet as well as the waste water outlet, and the pretreating filtering element is positioned between the raw water inlet and the pretreated water outlet, and the filtering membrane is positioned between the pretreated water inlet and the pure water outlet as well as the waste water outlet; and wherein pretreated water is exhausted from the shell through the pretreated water outlet and reenters the shell through the pretreated water inlet;

wherein the raw water inlet is configured as a single hole, the pretreated water outlet and the pretreated water inlet are formed in a nested manner, and the pretreated water inlet is nested within the pretreated water outlet;

wherein the pure water outlet and the waste water outlet are formed in a nested manner, and the pure water outlet is nested within the waste water outlet;

wherein the pretreated water outlet is formed in a lower portion of the shell and below the raw water inlet, the pure water outlet is formed at an upper portion of the shell, and an upper end of the central tube is open and communicated with the pure water outlet.

* * * * *